United States Patent [19]

Dalitz

[11] 4,211,036
[45] Jul. 8, 1980

[54] PLANTER BASKET

[76] Inventor: Shirley R. Dalitz, 1828 Millbank Rd., Leucadia, Calif. 92024

[21] Appl. No.: 793,919

[22] Filed: May 5, 1977

[51] Int. Cl.² .................... A01G 9/02; A01G 27/00
[52] U.S. Cl. ........................................ 47/66; 47/79; 206/524.3; 217/122
[58] Field of Search ............ 206/524.3, 524.9; 150/48; 217/122, 123, 3 R, 125; 428/35, 245, 247, 251, 252, 238; 427/236, 439; 47/79–81, 74, 73, 66; 220/64

[56] References Cited

U.S. PATENT DOCUMENTS

| 314,483 | 3/1885 | Scarles | 428/247 |
| 417,242 | 12/1889 | Haas | 206/524.3 |
| 2,332,373 | 10/1943 | Dorough et al. | 428/252 X |
| 2,536,590 | 1/1951 | Brandes | 217/122 X |
| 2,827,414 | 3/1958 | Bussard et al. | 428/245 X |
| 2,836,529 | 5/1958 | Morris | 428/238 X |
| 3,085,027 | 4/1963 | Porteous | 428/252 X |
| 3,091,896 | 6/1963 | Howard | 47/73 |

FOREIGN PATENT DOCUMENTS

| 1134981 | 4/1957 | France | 47/81 |
| 1414605 | 9/1965 | France | 47/80 |
| 12354 | of 1896 | United Kingdom | 47/66 |

OTHER PUBLICATIONS

"Waterproofing Baskets", p. 31 of Plant Containers You Can Make, Mar. 1976, LCN #75-26489.

Primary Examiner—Edgar S. Burr
Assistant Examiner—Steven A. Bratlie

[57] ABSTRACT

A plant basket, that is, a container having the configuration and decorative appearance of basketware combined with the necessary requirements for use as a planter and the like, namely, water-proof wall and bottom portions and reasonable ruggedness, and preferably also including a hidden drainage water reservoir, the reinforced transparent water-proofing material added to the basket being not a design feature but rather representing a multiplicity of combination window and stress panel structures.

2 Claims, 2 Drawing Figures

PLANTER BASKET

BACKGROUND OF THE INVENTION

The prior art related to the present invention is extremely old, since baskets are known to have been used in Biblical and much earlier times but such baskets were apparently not suitable for use as planters. Possibly the most famous early basket was occupied by the infant Moses floating in the Nile River, this basket being reputedly made of papyrus sealed with mud or natural tar but rather obviously such sealing would be very visible and opaque and such sealing material would not significantly reinforce the basketing material nor function as a preservative thereof. Prior art baskets of former times and presently available baskets are all notoriously fragile and nonresistant to environmental moisture, either internally or externally of the basket, and although decorative and often used as outer containers, presently available baskets are not practical for use as planters. Plastic baskets, such as that disclosed in U.S. Pat. No. 3,642,967 are simply not suitable for use as planters, even though they are sealed. There is a need, therefore, for a basket planter which will have very substantial ruggedness and long useful life and which will incorporate the necessary functions of a planter, including preferably the capability of storing certain excess drainage water.

SUMMARY OF THE INVENTION

As claimed, the present invention comprises a basket adapted for use as a planter in that the walls and bottom, inside and out are coated with a transparent material so that the decorative basket form is retained while the material of the basket proper is preserved against deterioration and reinforced against breakage or deformation, the coating material filling the interstices between the adjacent linear elements, rattan, grass, reeds and the like, are completely filled with the transparent, reinforced coating and sealing material providing stress panel functionally, but these filled interstices appear as expected holes in basketwear, to the casual observer.

DETAILED DESCRIPTION OF A PREFERRED EMBODIMENT

Figure 1:
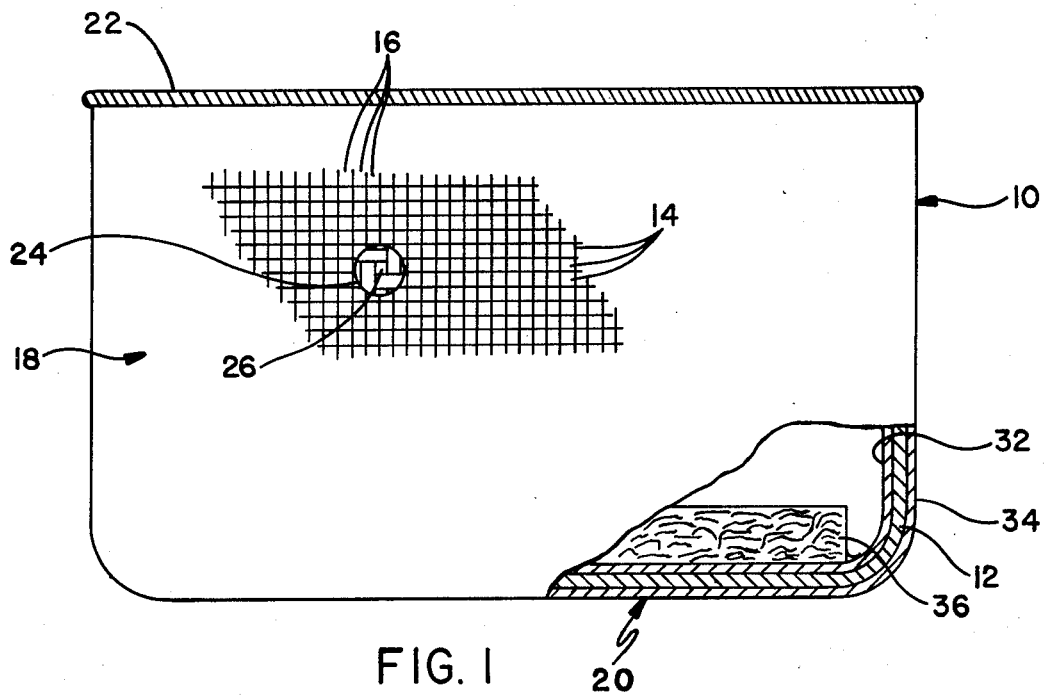
FIG. 1 is a somewhat diagrammatic, side elevational view of a basket planter with a portion cut away to show underlying parts, and with a fragment of the wall portion indicated as magnified to show a single interstice between four adjacent crossed linear elements.

Referring now to the drawing wherein like numerals refer to identical or similar parts in the different views, the numeral 10 indicates generally the planter basket constructed according to this invention. No particular type of basketweave is mandatory in carrying out this invention although it is a feature thereof that the basket or basketweave appearance, popularly considered as decorative, shall be preserved, so that this does require that appearance must exist in the basic basket used. This appearance will ordinarily include an open-topped vessel constructed of interwoven linear elements 12 used for both warp 14 and woof 16 portions of the ordinarily circular or polysided wall panels, illustrated by the wall panel portion 18, as well as the ordinarily substantially flat bottom portion 20. The terms "linear element" is also employed herein as conceptually including split roots, various kinds of warpping splints and sewing splints, rushes, grasses, cane and the like. This invention also contemplates a natural extension to include basketweave of intricate multiple strand interweave design, twining and coiling often employed in panels, rope base borders, appendages and top rim borders, simply exemplified by the coiled rim border 22.

Figure 2:
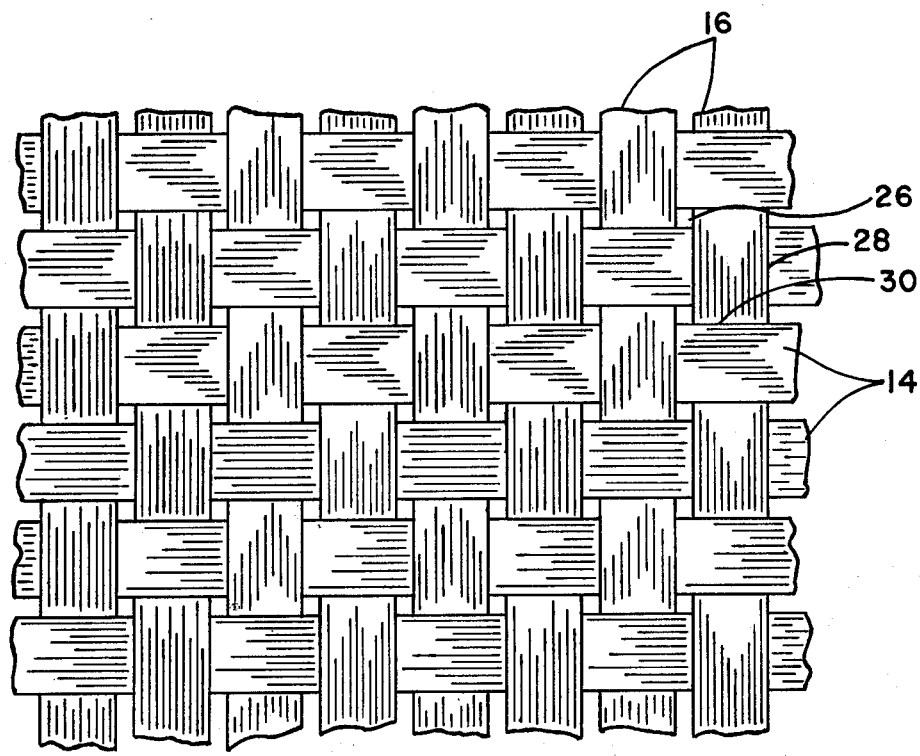
FIG. 2 is a fragmentary, enlarged view showing a plurality of linear elements with interstices therebetween.

A small segment 24 of the wall portion 18 in FIG. 1 is shown magnified to illustrate a single interstice 26 ordinarily repetatively existing between each adjacent pair of warp linear elements 14 and an adjacent pair of woof linear elements 16. This interstice may be square as shown and the dimensions thereof will vary greatly in different basketweave patterns, even virtually disappearing as in some Alaskan and South American Indian basketware but interstices 26, making the baskets far from watertight, will regularly be present. In all basketwear a large plurality of what may be regarded as linear interstices occur at the edges 28, 30 of the linear elements 12, that is, at the edges defined by the overlayed elements as is clearly indicated in FIG. 2.

It is proposed by this invention to preserve the appearance of openness of the interstices 26 while closing the same, by filling the interstices with transparent material which is integral with outer layer 34 and inner layer 32 which covers the outside and inside surfaces of the basket, respectively, and also seals the warp 14 and woof 16 linear elements 12 at all the edges 28 and 30 thereof. The material is preferably fiberglass-reinforced resin and will ordinarily be sprayed on with a gun equipped to add chopped fiberglass and catalyst in measured amounts to a stream of resin. A considerable latitude in the method of application and the resin material used is conceived as being within the ambit of this invention but the material should be transparent or translucent and, when set up, the resin material should have great strength. It will be noted, however, that there are two layers, the inside layer 32 and the outside layer 34 and these layers are connected by a myriad of bonds of resin at the interstices 26 to constitute a sandwich panel of great inherent strength. Furthermore the bonding achieved at each edge 28-30 transforms the myriad segments of the linear elements into small stress panels, and the resin filling each interstice 26 is also a tiny stress panel, so that the entire basket is made resistant to deformation or breakage far beyond that of an ordinary basket.

On the inside or upper surface of the bottom portion 20 there is fastened a porous structure 36 capable of storing a quantity of water. This feature further adapts the basket planter to its intended use inasmuch as even a considerable over-watering of plants in such a planter will not injure the plants because excess or drainage water will gravitate to and be stored in the porous structure 36. It will be obvious that this feature obviates the necessity for saucer-type structures often placed under pots and planters. The structure 34 may be a sponge such as a section of a Luffa gourd, also called "vegetable sponge" and "strainer vine" and technically known as "cucurbitacea," and is held in place by the inner layer 32 of resin which acts as an adherent.

Finally, it is noteworthy that the interior layer 32 prevents root damage to the planter and the reinforcement of the upper rim border 22 by the resin lessens the likelihood of damage to this portion of the planter. Obviously the useful life of the basket planter is greatly increased since mildew and similar forms of deterioration are completely avoided.

Having described my invention, what I claim as new is:

1. An open-topped decorative basket having wall and bottom portions;
    (a) said portions being constructed of linear elements in basketweave pattern with portions of said elements overlaid and with interstices defined between said elements in both said wall and bottom portions;
    (b) a sealing material coating said elements and completely filling said interstices;
    (c) said material being transparent and therefore substantially invisible so that the appearance of the decorative basket, with the basketweave pattern and interstices as such, is retained;
    (d) said material being waterproof so that said elements are preserved against deterioration and the basket is waterproofed as a container for use as a planter;
    (e) said bottom portion having an essentially porous structure attached on the inside of said bottom portion and being held in place on said bottom portion by said sealing material for storage of a limited quantity of drainage water within the waterproofed container.

2. A basket according to claim 1 wherein said porous structure comprises a cucurbitaceae sponge.

* * * * *